(12) United States Patent
Liao

(10) Patent No.: US 10,732,736 B2
(45) Date of Patent: Aug. 4, 2020

(54) INTERACTIVE DEVICE STYLUS

(71) Applicants: Guangzhou Shiyuan Electronics Co., Ltd., Guangzhou (CN); Guangzhou Shirui Electronics Co., Ltd., Guangzhou (CN)

(72) Inventor: Jinhai Liao, Guangzhou (CN)

(73) Assignees: GUANGZHOU SHIYUAN ELECTRONICS CO., LTD., Guangzhou (CN); GUANGZHOU SHIRUI ELECTRONICS CO., LTD., Guangzhou (CN)

( * ) Notice: Subject to any disclaimer, the term of this patent is extended or adjusted under 35 U.S.C. 154(b) by 0 days.

(21) Appl. No.: 16/337,499

(22) PCT Filed: Sep. 27, 2017

(86) PCT No.: PCT/CN2017/103788
§ 371 (c)(1),
(2) Date: Mar. 28, 2019

(87) PCT Pub. No.: WO2018/103428
PCT Pub. Date: Jun. 14, 2018

(65) Prior Publication Data
US 2019/0286256 A1 Sep. 19, 2019

(30) Foreign Application Priority Data
Dec. 9, 2016 (CN) .................. 2016 2 1349544 U

(51) Int. Cl.
*G06F 3/0354* (2013.01)
*H04W 4/80* (2018.01)
(52) U.S. Cl.
CPC ........ *G06F 3/03545* (2013.01); *G06F 3/0354* (2013.01); *H04W 4/80* (2018.02)

(58) Field of Classification Search
CPC .. G06F 3/03545; G06F 3/0354; G06F 3/0383; G06F 3/04162; H04W 4/80
See application file for complete search history.

(56) References Cited

U.S. PATENT DOCUMENTS 4,786,765 A * 11/1988 Yamanami .......... G06F 3/03545
178/19.06
5,138,118 A * 8/1992 Russell ................... G06F 3/046
178/19.03
(Continued)

FOREIGN PATENT DOCUMENTS

CN 201231609 Y * 5/2009
CN 201231609 Y 5/2009
(Continued)

OTHER PUBLICATIONS

International Search Report for PCT/CN2017/103788 dated Jan. 18, 2018, 10 pages.

*Primary Examiner* — Michael J Eurice
(74) *Attorney, Agent, or Firm* — Zhong Law, LLC

(57) ABSTRACT

An interactive device stylus includes a stylus body, a stylus cap disposed at a front end of the stylus body, and a stylus head disposed on the stylus cap. The stylus head is fixed to a front end of the stylus cap via a connecting piece, a through-hole is provided in the connecting piece, and the inner diameter of the through-hole gradually decreases from the inside of the connecting piece to a free end of the connecting piece, so that a limiting portion is formed at the free end of the connecting piece. The stylus head is engaged in the connecting piece via the limiting portion. A fixing rod is provided in the stylus cap, and an end of the fixing rod is pressed against the stylus head.

13 Claims, 8 Drawing Sheets

(56) References Cited

U.S. PATENT DOCUMENTS

| | | | |
|---|---|---|---|
| 9,195,351 B1* | 11/2015 | Rosenberg | G06F 1/1626 |
| 2005/0128191 A1* | 6/2005 | Katsurahira | G06F 1/3203 |
| | | | 345/179 |
| 2006/0250374 A1* | 11/2006 | Morita | G06F 3/0488 |
| | | | 345/173 |
| 2011/0295215 A1* | 12/2011 | Nielsen | G16H 20/17 |
| | | | 604/257 |
| 2013/0257777 A1* | 10/2013 | Benko | G06F 3/03545 |
| | | | 345/173 |
| 2015/0094914 A1* | 4/2015 | Abreu | B60H 1/00742 |
| | | | 701/41 |
| 2015/0149347 A1* | 5/2015 | Liu | G06Q 20/204 |
| | | | 705/39 |
| 2015/0277586 A1* | 10/2015 | Trenholm-Boyle | |
| | | | G06F 3/0308 |
| | | | 345/157 |
| 2015/0286309 A1* | 10/2015 | Chang | G06F 3/03545 |
| | | | 345/174 |
| 2016/0066789 A1* | 3/2016 | Rogers | A61N 1/05 |
| | | | 604/20 |
| 2016/0134737 A1* | 5/2016 | Pulletikurty | G06F 3/0227 |
| | | | 715/735 |
| 2016/0139690 A1* | 5/2016 | Chang | G06F 3/0383 |
| | | | 345/179 |
| 2016/0179223 A1* | 6/2016 | Konanur | G06K 9/00087 |
| | | | 345/179 |
| 2017/0012706 A1* | 1/2017 | Livshits | H04B 10/2587 |
| 2017/0068339 A1* | 3/2017 | Zimmerman | G06F 3/0383 |
| 2017/0168593 A1* | 6/2017 | Kwak | G06F 1/1669 |
| 2017/0277286 A1* | 9/2017 | Chiu | G06F 3/03545 |
| 2018/0154679 A1* | 6/2018 | Mitchell | B43K 23/001 |

FOREIGN PATENT DOCUMENTS

| | | | | |
|---|---|---|---|---|
| CN | 203799342 U | * | 8/2014 | G06F 3/03545 |
| CN | 203799342 U | | 8/2014 | |
| CN | 203838657 U | * | 9/2014 | |
| CN | 203838657 U | | 9/2014 | |
| CN | 204044768 U | * | 12/2014 | |
| CN | 204044768 U | | 12/2014 | |
| CN | 206270897 U | * | 6/2017 | H04W 4/80 |
| CN | 206270897 U | | 6/2017 | |

* cited by examiner

US 10,732,736 B2

INTERACTIVE DEVICE STYLUS

CROSS-REFERENCE TO RELATED APPLICATIONS

This application is a national stage of PCT/CN2017/103788 filed Sep. 27, 2017, which claims priority to Chinese application CN 201621349544.X filed Dec. 9, 2016, the contents of which are hereby incorporated by reference in their entireties.

TECHNICAL FIELD

The disclosure relates to the technical field of stylus, in particular, to an interactive device stylus.

BACKGROUND

With the development of technology and the continuous improvement of people's living standards, interactive devices such as tablets have become commonly used by the public, and the electronic styluses working with the interactive devices have also been developed rapidly. An interactive device stylus records the trajectory of a pen or a finger by means of various methods and recognizes the trajectory as a character. Because an interactive device stylus does not require a person to learn input methods, it is very useful for those who do not like to use keyboards or are not accustomed to use Chinese input methods. Interactive device styluses are widely used in the fields of circuit design, CAD design, graphic design, free painting, text and data input and the like, because it is easy to use and has low cost.

An existing interactive device stylus includes a stylus body and a stylus head disposed in the stylus body. A user may hold the stylus body to write using the stylus head, and the stylus head of the existing interactive device styluses are closely-fitted directly to the stylus body.

The above interactive device stylus only has an only single function of basic writing, and the mount of the stylus head onto the stylus body is unstable. The variations of the mating components may lead to frequent loosening and fall-off of the stylus head from the stylus body, resulting in unstable structure and causing severe impacts on the user experience.

SUMMARY

To overcome the identified issues, the disclosure is to provide an interactive device stylus with a stable structure.

An interactive device stylus includes a stylus body, a stylus cap disposed at a front end of the stylus body, and a stylus head disposed on the stylus cap, the stylus head is fixed to a front end of the stylus cap via a connecting piece, a through-hole is provided in the connecting piece, and the inner diameter of the through-hole gradually decreases from the inside of the connecting piece to a free end of the connecting piece, to form a limiting portion at the free end of the connecting piece, the stylus head is engaged in the connecting piece via the limiting portion, a fixing rod is provided in the stylus cap, and an end of the fixing rod is pressed against the stylus head.

The above-described interactive device stylus, via the design of the limiting portion, engages the stylus head with the connecting piece using the limiting portion, thereby improving the stability of the structure between the stylus head and the connecting piece, and further support stylus head through the design of the fixing rod, thereby further improving the stability of the stylus head within the connecting piece.

Further, a first near field communication (NFC) chip is provide between the fixing rod and the stylus head, the end of the fixing rod is pressed against the stylus head through the first NFC chip, a fastener is provided at a rear end of the stylus body, a groove is provided on the fastener, and a second NFC chip is provided in the groove.

Further, a supporting column and a limiting foam are provided in the stylus body, one end of the supporting column and the stylus cap abut against each other, and the other end of the supporting column is connected to the second NFC chip via the limiting foam.

Further, a protruding portion is provided on the stylus head, the protruding portion is overlappingly connected to the limiting portion, for limiting the position of the stylus head, and an external diameter of the stylus head decreases from the protruding portion to a free end of the stylus head.

Further, a radius of the stylus head is smaller than that of the connecting piece, and the radius of the connecting piece is smaller than that of the stylus cap.

Further, a male buckle portion is provided on the stylus cap, a female buckle portion is provided in the stylus body, and the male buckle portion and the female buckle portion match with each other.

Further, the connecting piece and the stylus cap, as well as between the rear end of the stylus body and the fastener, are coupled through thread connection.

Further, an LED light is provided on the stylus body, and the LED light emits light towards a direction of the stylus head.

Further, a pull ring is provided on the fastener, facilitating the rotation operation to the fastener.

DESCRIPTION OF REFERENCE NUMBERS OF MAIN ELEMENTS

Figure 1:
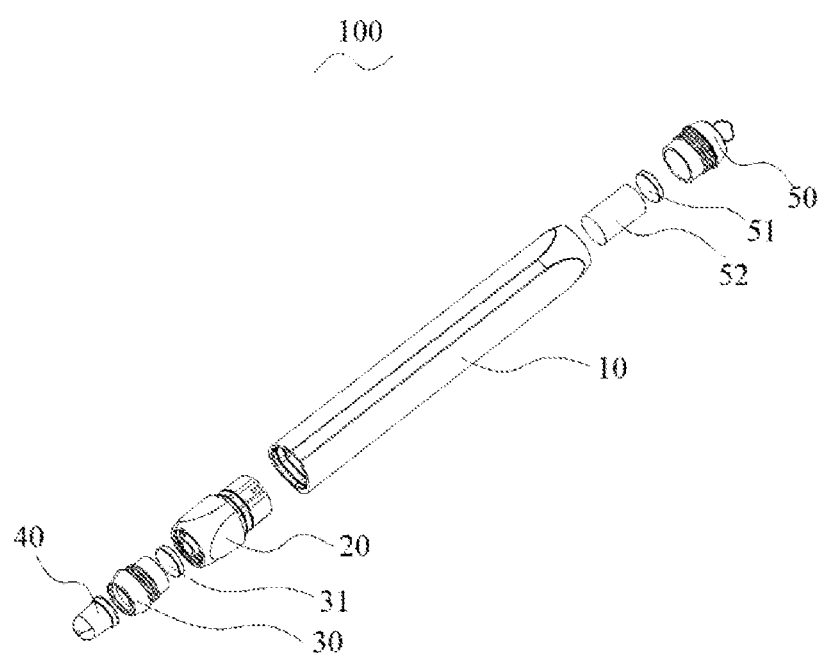
FIG. 1 is a schematic structural diagram of an interactive device stylus 100 according to a first embodiment of the disclosure.
Figure 2:
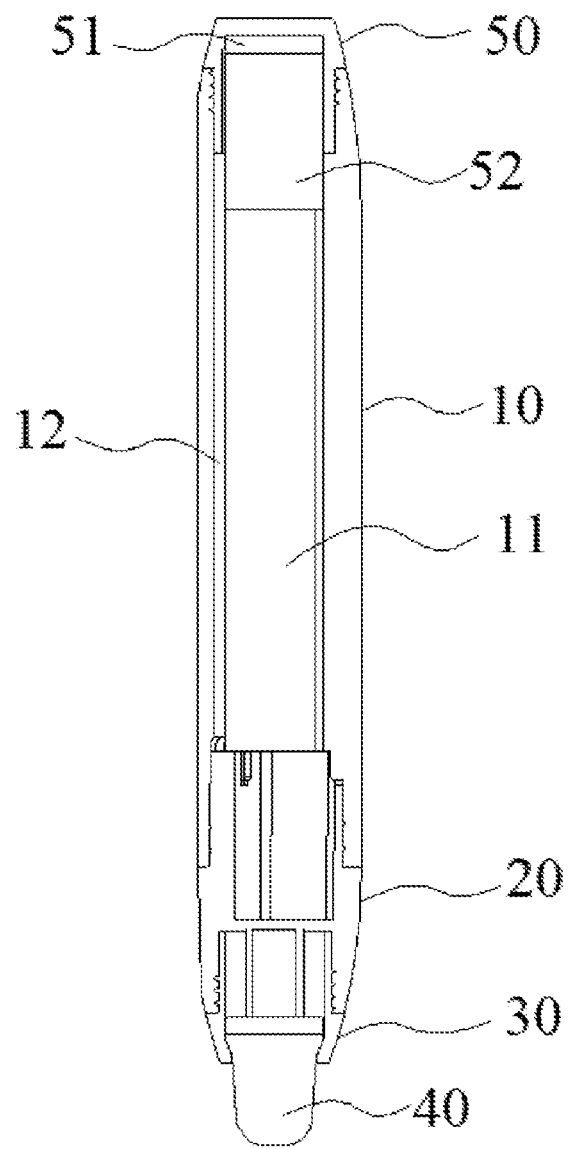
FIG. 2 is a cross-sectional structural diagram of the interactive device stylus 100 according to the first embodiment of the disclosure.
Figure 3:
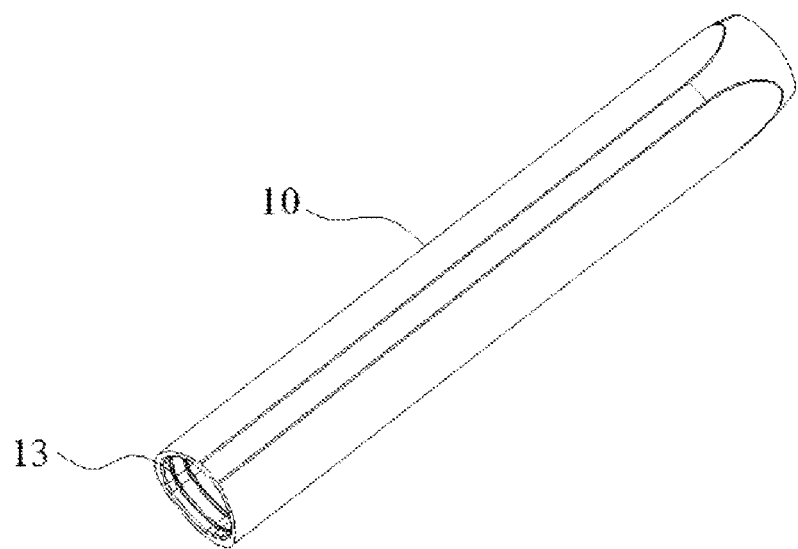
FIG. 3 is a structural diagram of a stylus body 10 in FIG. 1.
Figure 4:
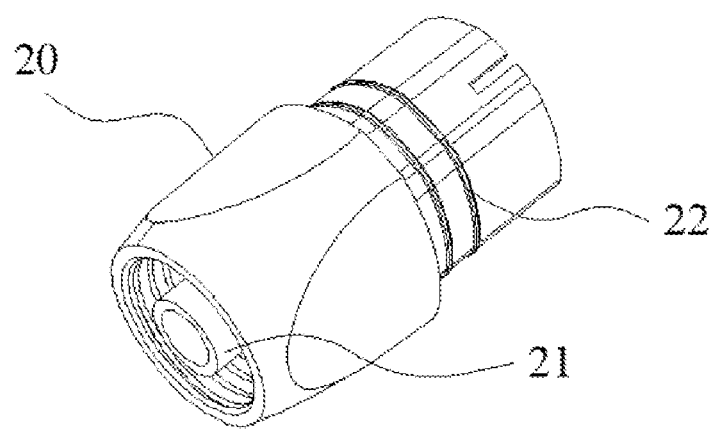
FIG. 4 is a structural diagram of a stylus cap 20 in FIG. 1.

| interactive device stylus | 100, 200 | stylus body | 10 |
| supporting column | 11 | limiting tube | 12 |
| female buckle portion | 13 | LED light | 14 |
| stylus cap | 20 | fixing rod | 21 |
| male buckle portion | 22 | connecting piece | 30 |
| first NFC chip | 31 | limiting portion | 32 |

| | | | |
|---|---|---|---|
| through-hole | 33 | stylus head | 40 |
| protruding portion | 41 | fastener | 50 |
| second NFC chip | 51 | limiting foam | 52 |
| groove | 53 | pull ring | 54 |

The disclosure will be further described in specific embodiments below in conjunction with the above-mentioned accompanying drawings.

DESCRIPTION OF EMBODIMENTS

For a better understanding of the disclosure, the disclosure will be further explained in conjunction with the accompanying drawings of related embodiments. Embodiments of the disclosure are given in accompanying drawings, but the disclosure is not limited to the preferred embodiments mentioned above. Instead, the embodiments are provided to make the disclosure more complete.

Referring to FIGS. 1 to 5, the first embodiment of the disclosure provides an interactive device stylus 100, including a stylus body 10, a stylus cap 20 disposed at a front end of the stylus body 10, and a stylus head 40 disposed on the stylus cap 20. The stylus head 40 is fixed to a front end of the stylus cap 20 via a connecting piece 30. A through-hole 33 is provided in the connecting piece 33, and an inner diameter of the through-hole 33 gradually decreases from the inside of the connecting piece 30 to a free end of the connecting piece 30, to form a limiting portion 32 at the free end of the connecting piece 30. The stylus head 40 is engaged in the connecting piece 30 via the limiting portion 32. A fixing rod 21 is provided in the stylus cap 20, and an end of the fixing rod 21 is pressed against the stylus head 40.

The stylus body 10 adopts a cylindrical structure. A supporting column 11 and a limiting tube 12 serving as a limiting bound for the supporting column 11 are provided in the stylus body 10, and a top end of the supporting column 11 is supported inside the stylus cap 20. The supporting column 11 adopts a cylindrical structure with a radius smaller than that of the stylus body 10, and is fixed in the stylus body 10 by the limiting tube 12. The supporting column 11 in this embodiment is made of an iron tube, so that the interactive device stylus 100 can be attached to a magnetified structure component of a machine, thereby facilitating the placement and grasping of the interactive device stylus 100.

The fixing rod 21 adopts a cylindrical hollow structure. A first NFC chip 31 is provided between the fixing rod 21 and the stylus head 40, and an end of the fixing rod 21 is pressed against the stylus head 40 by the first NFC chip 31. A fastener 50 is provided at a rear end of the stylus body 10, where the fastener 50 has a cap-shaped structure, a groove 53 is provided on the fastener 50, and a second NFC chip 51 is provided in the groove 53. The first NFC chip 31 and the second NFC chip 51 are configured to interconnect with an external device, so that colors and thickness of strokes written to the external device can be automatically adjusted by the interactive device stylus 100.

In this embodiment, a limiting foam 52 is further provided in the stylus body 10. One end of the supporting column 11 and the stylus cap 20 abut against each other, and the other end of the supporting column 11 is connected with the second NFC chip 51 via the limiting foam 52. One end of the limiting foam 52 contacts with a rear end of the supporting column 11, and the other end of the limiting foam 52 contacts with the second NFC chip 51. The limiting foam 52 limits the positions among the second NFC chip 51, the supporting column 11 and the fastener 50, so that the structure formed among the second NFC chip 51, the supporting column 11 and the fastener 50 becomes more stable, and the limiting foam 52 also increases the distance between the supporting column 11 and the second NFC chip 51, which prevents the supporting column 11 from interfering the second NFC chip 51, thereby ensuring the sensitiveness of the interactive device stylus 100.

The first NFC chip 31 and the second NFC chip 51 can be customized according to the requirements of different users, increasing the resolution of the interactive device stylus 100 and thereby further satisfying the customization requirements by the users.

Figure 5:
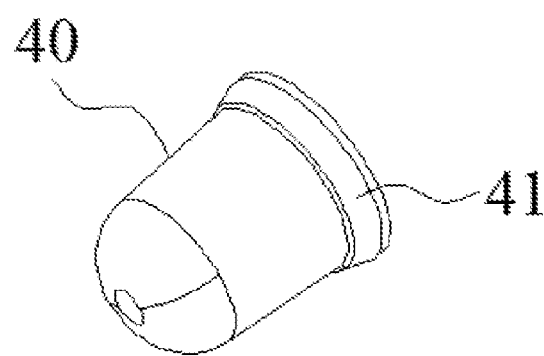
FIG. 5 is a structural diagram of a stylus head 40 in FIG. 1.
Figure 6:
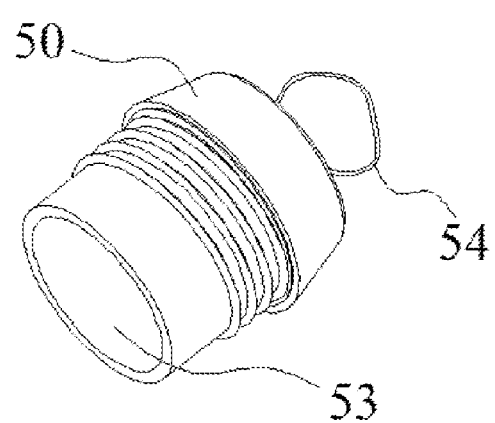
FIG. 6 is a structural diagram of a fastener 50 in FIG. 1.

Referring to FIG. 5, which is a structural diagram of stylus head 40 in FIG. 1, wherein the stylus head 40 is made of PE Styrofoam, and is a component for writing and touch control. The stylus head 40 adopts a cylindrical structure with a radius of a bottom end larger than that of a top end. A protruding portion 41 is provided on the stylus head 40, and is overlappingly connected to the limiting portion 32, for limiting the position of the stylus head 40. The external diameter of the stylus head 40 gradually decreases from the protruding portion 41 to a free end of the stylus head 40. The design of the protruding portion 41 further makes the stylus head 40 less likely to fall out of the connecting piece 30, thus improving the structural stability between the connecting piece 30 and the stylus head 40.

The stylus cap 20 plays a fixing role for the first NFC chip 31 and the stylus head 40, and is connected with the stylus body 10. An annular male buckle portion 22 is provided on the stylus cap 20, and an annular female buckle portion 13 is provided in the stylus body 10. The male buckle portion 22 and the female buckle portion 13 match with each other, further making a fixed coupling between the stylus cap 20 and the stylus body 10 through a snap joint. The design of the male buckle portion 22 and the female buckle portion 13 simplifies the structure of the interactive device stylus 100 and reduces the complexity of mold making, thereby improving the manufacture efficiency of the interactive device stylus 100.

In this embodiment, the radius of the stylus head 40 is smaller than that of the connecting piece 30, thus allowing a complete insertion of the stylus head 40 into the connecting piece 30. The radius of the connecting piece 30 is smaller than that of the stylus cap 20, so that the rear end of the connecting piece 30 can be enclosed by the stylus cap 20, thereby improving the structural stability between the connecting piece 30 and the stylus cap 20.

Figure 7:
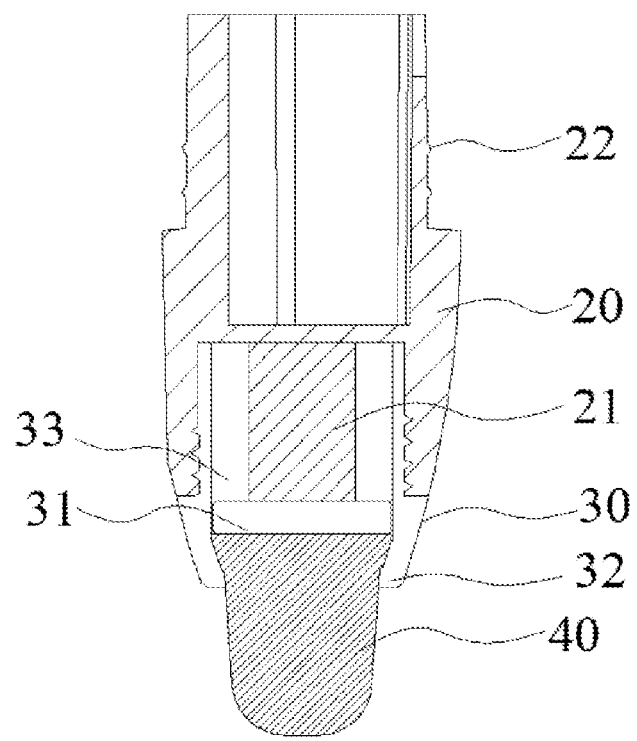
FIG. 7 is a structural diagram of the structure between connecting piece 30 and the stylus cap 20 according to the first embodiment of the disclosure.

FIG. 7 is a structural diagram of the structure between the connecting piece 30 and the stylus cap 20 according to the first embodiment of the disclosure, where the connecting piece 30 and the stylus cap 20, as well as between the rear end of the stylus body 10 and the fastener 50, are connected by threads.

Between the connecting piece 30 and the stylus cap 20, a thread is provided at the rear end of the connecting piece 30, and a thread groove is provided on an inner wall of the stylus cap 20. The connecting piece 30 is coupled to the stylus cap 20 by rotating the connecting piece 30, and the thread design between the connecting piece 30 and the stylus cap 20 facilitates disassembly and assembly of the first NFC chip 31, thereby reducing time for replacing the first NFC chip 31 for the interactive device stylus 100 and improving the usability of the interactive device stylus 100.

Between the fastener 50 and the rear end of the stylus body 10, a thread is provided on the fastener 50, and the thread groove is provided on an inner wall of the rear end of the stylus body 10. The fastener 50 is fixed onto the stylus body 10 by rotating the fastener 50, and the thread design between the fastener 50 and the rear end of the stylus body 10 facilitates the disassembly and assembly of the second NFC chip 51 and the supporting column 11, thereby reducing time for replacing the second NFC chip 51 and the supporting column 11 for the interactive device stylus 100, and improving the usability of the interactive device stylus 100.

Further, in this embodiment, a pull ring 54 is provided on the fastener 50. The pull ring 54 is of an annular structure, and a width of a through-hole of the pull ring 54 is larger than that of a finger of an adult. When the fastener 50 is to be rotated into the stylus body 10, the rotation can be performed by rotating the pull ring 54, thereby facilitating the rotation operation to the fastener 50.

The assembly process of the disclosure is as follows: firstly, the stylus head 40 is inserted from the bottom end of the connecting piece 30, and then, the first NFC chip 31 is placed in upon an engagement of the stylus head 40 with the limiting portion 32, the first NFC chip 31 is stacked upon the bottom end of the stylus head 40, and then the fixing rod 21 is supported at the bottom end of the first NFC chip 31 by rotating the connecting piece 30, thus completing the assembly of the stylus head 40, the connecting piece 30 and the stylus cap 20.

The stylus cap 20 is fixed to the stylus body 10 by pressing the male buckle portion 22 to the female buckle portion 13.

The supporting column 11 is inserted from the bottom end of the stylus body 10, the position of the supporting column 11 is limited by the limiting tube 12, the limiting foam 52 is placed at the rear end of the supporting column 11, and the second NFC chip 51 is inserted into the groove 53 of the fastener 50, and then the fastener 50 is aligned to the stylus body 10, the fastener 50 is rotated, so that the supporting column 11 and the second NFC chip 51 are pressed by the limiting foam 52, thus completing the assembly process of the interactive device stylus 100.

In this embodiment, through the design of the limiting portion 32, the stylus head 40 is engaged in the connecting piece 30 using the limiting portion 32, thereby improving the structural stability between the stylus head 40 and the connecting piece 30. The first NFC chip 31 and the stylus head 40 are supported through the design of the fixing rod 21, thereby improving the structural stability among the first NFC chip 31, the stylus head 40 and the connecting piece 30. The design of the limiting foam 52 makes the structure among the second NFC chip 51, the supporting column 11 and the fastener 50 more stable, and the limiting foam 52 also increases the distance between the supporting column 11 and the second NFC chip 51, which prevents the supporting column 11 from interfering the second NFC chip 51, thereby ensuring the resolution of the interactive device stylus 100. The thread connection between the connecting piece 30 and the stylus cap 20 as well as the thread connection between the rear end of the stylus body 10 and the fastener 50 make the structure of the stylus body 10 more stable and easier for disassembly and assembly. The design of the first NFC chip 31 and the second NFC chip 51 can make the interactive device stylus 100 automatically adjust colors and thickness of strokes written to the external device.

Figure 8:
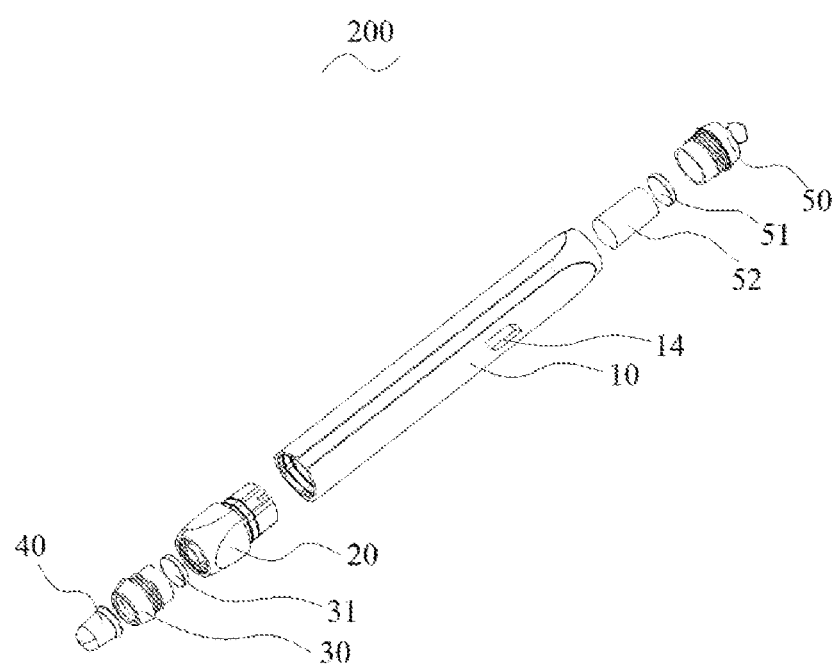
FIG. 8 is a structural diagram of an interactive device stylus 200 of a second embodiment of the disclosure.

Referring to FIG. 8, which is a structural diagram of an interactive device stylus 200 according to a second embodiment of the disclosure, the second embodiment is substantially similar to the first embodiment, where the difference is that, in this embodiment, an LED light 14 is further provided on the stylus body 10, and the LED light 14 emits light towards a direction of the stylus head 40. When the brightness of the light provided to the user is relatively low, the user can continue normal use via the LED light 14, and the interactive device stylus 200 can be used as a flashlight via the LED light 14, thereby improving the usability of the interactive device stylus 200.

The technical principles of the disclosure have been described with the above embodiments, and the those descriptions are merely for explaining the principles of the disclosure, and cannot be interpreted in any way as a limitation of the protection scope of the disclosure. Based on the explanation herein, those skilled in the art associate with other specific implementations of the disclosure without any creative work, and all these implementations will fall into the protection scope of the disclosure.

The invention claimed is:

1. An interactive device stylus, comprising a stylus body, a stylus cap disposed at a front end of the stylus body, and a stylus head disposed on the stylus cap, wherein the stylus head is fixed to a front end of the stylus cap via a connecting piece, a through-hole is provided in the connecting piece, and an inner diameter of the through-hole gradually decreases from the inside of the connecting piece to a free end of the connecting piece to form a limiting portion at the free end of the connecting piece, the stylus head is engaged in the connecting piece via the limiting portion, a fixing rod is provided in the stylus cap, and an end of the fixing rod is pressed against the stylus head.

2. The interactive device stylus according to claim 1, wherein a male buckle portion is provided on the stylus cap, a female buckle portion is provided in the stylus body, and the male buckle portion and the female buckle portion match with each other.

3. The interactive device stylus according to claim 1, wherein an LED light is provided on the stylus body, and the LED light is to emit a light towards a direction of the stylus head.

4. The interactive device stylus according to claim 1, wherein a protruding portion is provided on the stylus head, the protruding portion is overlappingly connected to the limiting portion, and an external diameter of the stylus head decreases from the protruding portion to a free end of the stylus head.

5. The interactive device stylus according to claim 4, wherein a radius of the stylus head is smaller than a radius of the connecting piece, and the radius of the connecting piece is smaller than a radius of the stylus cap.

6. An interactive device stylus, comprising a stylus body, a stylus cap disposed at a front end of the stylus body, and a stylus head disposed on the stylus cap, wherein the stylus head is fixed to a front end of the stylus cap via a connecting piece, a through-hole is provided in the connecting piece, and an inner diameter of the through-hole gradually decreases from the inside of the connecting piece to a free end of the connecting piece to form a limiting portion at the free end of the connecting piece, the stylus head is engaged in the connecting piece via the limiting portion, a fixing rod is provided in the stylus cap, and an end of the fixing rod is pressed against the stylus head, and wherein a first near field communication (NFC) chip is provided between the fixing rod and the stylus head, a first end of the fixing rod is pressed against the stylus head by the first NFC chip, a fastener is provided at a rear end of the stylus body, a groove is provided on the fastener, and a second NFC chip is provided in the groove.

7. The interactive device stylus according to claim 6, wherein a supporting column and a limiting foam are provided in the stylus body, a first end of the supporting column and the stylus cap abut against each other, and a second end of the supporting column is connected to the second NFC chip via the limiting foam.

8. The interactive device stylus according to claim 6, wherein a male buckle portion is provided on the stylus cap, a female buckle portion is provided in the stylus body, and the male buckle portion and the female buckle portion match with each other.

9. The interactive device stylus according to claim 6, wherein the connecting piece and the stylus cap, as well as a rear end of the stylus body and the fastener, are connected by threads.

10. The interactive device stylus according to claim 6, wherein an LED light is provided on the stylus body, and the LED light is to emit a light towards a direction of the stylus head.

11. The interactive device stylus according to claim 6, wherein a pull ring is provided on the fastener.

12. The interactive device stylus according to claim 6, wherein a protruding portion is provided on the stylus head, the protruding portion is overlappingly connected to the limiting portion, and an external diameter of the stylus head decreases from the protruding portion to a free end of the stylus head.

13. The interactive device stylus according to claim 12, wherein a radius of the stylus head is smaller than a radius of the connecting piece, and the radius of the connecting piece is smaller than a radius of the stylus cap.

* * * * *